United States Patent

Takeuchi

[11] Patent Number: 6,068,916
[45] Date of Patent: May 30, 2000

[54] TENSION MEMBER FOR BELT, METHOD OF PRODUCING THE SAME AND BELT INCLUDING THE SAME

[75] Inventor: Yuji Takeuchi, Kobe, Japan

[73] Assignee: Bando Chemical Industries, Ltd., Kobe, Japan

[21] Appl. No.: 08/736,359

[22] Filed: Oct. 23, 1996

[30] Foreign Application Priority Data

Oct. 30, 1995 [JP] Japan .................................. 7-281805
Oct. 30, 1995 [JP] Japan .................................. 7-281914
Oct. 30, 1995 [JP] Japan .................................. 7-281915

[51] Int. Cl.$^7$ ........................................................ D02G 3/00
[52] U.S. Cl. ......................... 428/377; 428/375; 428/378; 428/392
[58] Field of Search ...................... 428/325, 377, 428/378, 392; 57/284, 207, 229, 232; 152/451; 156/910; 474/260, 268

[56] References Cited

U.S. PATENT DOCUMENTS

| 3,252,278 | 5/1966 | Marzocchi | 428/392 |
| 4,016,325 | 4/1977 | Flautt et al. | 152/451 |
| 4,026,244 | 5/1977 | Elmer | 156/110 |
| 4,790,802 | 12/1988 | Onoe et al. | 57/204 |
| 5,060,466 | 10/1991 | Matsuda et al. | 57/232 |
| 5,077,127 | 12/1991 | Mori et al. | 428/392 |
| 5,368,928 | 11/1994 | Okamura et al. | 156/910 |
| 5,521,007 | 5/1996 | Kurokawa | 457/204 |

FOREIGN PATENT DOCUMENTS

| 59-15587 | 1/1984 | Japan . |
| 59-83234 | 6/1984 | Japan . |
| 63-76935 | 4/1988 | Japan . |
| 63-99933 | 5/1988 | Japan . |
| 63-92852 | 6/1988 | Japan . |
| 63-270877 | 11/1988 | Japan . |
| 2-4715 | 1/1990 | Japan . |
| 342290 | 6/1991 | Japan . |
| 3170534 | 7/1991 | Japan . |
| 3-260186 | 11/1991 | Japan . |
| 4-8947 | 1/1992 | Japan . |
| 450144 | 2/1992 | Japan . |
| 459640 | 2/1992 | Japan . |
| 6-147274 | 11/1992 | Japan . |
| 6-57568 | 11/1992 | Japan . |
| 6184853 | 7/1994 | Japan . |
| 7-27179 | 1/1995 | Japan . |
| 7504236 | 5/1995 | Japan . |
| 7-281805 | 8/1998 | Japan . |
| 7-281915 | 8/1998 | Japan . |

*Primary Examiner*—Newton Edwards
*Assistant Examiner*—J. M. Gray
*Attorney, Agent, or Firm*—Sixbey Friedman Leedom & Ferguson; Thomas W. Cole

[57] ABSTRACT

A plurality of glass fiber strands are parallel-arranged and primary-twisted into a primary twist yarn. A plurality of the primary twist yarns are parallel-arranged, are dipped in an adhesion treatment liquid containing as a main ingredient a mixture of a precondensate of resorcine formaldehyde and latex, are returned from the liquid and are then subjected to heat treatment. Thereafter, the plurality of primary twist yarns are final-twisted thereby forming a tension member for belt having a large adhesive property between the adjacent primary twist yarns.

5 Claims, 5 Drawing Sheets

TENSION MEMBER FOR BELT, METHOD OF PRODUCING THE SAME AND BELT INCLUDING THE SAME

BACKGROUND OF THE INVENTION

This invention relates to a tension member for belt, method of producing a tension member for belt and various kinds of belts such as a synchronous belt, a V-belt, a flat belt and a variable speed belt using the above-mentioned tension member.

A glass cord is generally used as a tension member for power transmission belt such as a synchronous belt to increase the strength of the belt and improve the toughness or the dimensional stability of the belt. For example, in a power transmission belt used for driving an overhead cam (OHC) of an automobile engine, a cord designated as ECG150-3/13 is generally used as a tension member. The ECG150-3/13 cord is obtained in a way of parallel-arranging three glass fiber strands each composed of 200 fibers having a fiber diameter of 9 μm, primary-twisting them into a primary twist yarn, parallel-arranging 13 primary twist yarns and final-twisting them. In short, the tension member has undergone primary twist and final twist.

Such a tension member is fabricated using glass fiber strands treated with resorcine formaldehyde rubber latex (RFL) in order to improve the adhesive strength of the tension member with the rubber belt body (See Japanese Patent Publication No. 3-42290, Japanese Patent Application Laid-Open No. 4-59640 or Japanese Patent Application Laid-Open No. 4-50144). In detail, the glass fiber strands are dipped in an RFL liquid, are returned from the liquid, are dried by heating and are then subjected to primary twist and final twist.

Meanwhile, in view of the recent tendency of increase in temperature around an automobile engine, there has been applied to rubber for automobile engine belt hydrogenated nitrile rubber having the heat resistance more excellent than chloroprene rubber conventionally used. Hydrogenated nitrile rubber has poor adhesive strength as compared with other kinds of rubber materials. Therefore, there is also proposed a technique that a rubber cement is further applied to the above-mentioned final twist yarn (See Japanese Patent Application Laid-Open No. 2-4715 or Japanese Patent Application Laid-Open No. 3-170534).

Further, there is also proposed a technique that hydrogenated nitrile rubber (H-NBR) latex having excellent heat resistance and small water absorbing property is used as latex of the above-mentioned RFL liquid (See Japanese Patent Application Laid-Open No. 63-270877).

SUMMARY OF THE INVENTION

An object of the present invention is to improve the water resistance of a tension member for belt made of glass fibers, i.e., the water resistance of the belt.

When a belt using a conventional tension member made of a glass cord is used in hot and humid conditions, for example, in rain, a problem is caused that the tension member is degraded at an early stage so that the belt strength is extremely decreased and another problem is caused that the flex fatigue resistance of the belt is reduced thereby readily breaking the belt. The present invention solves such above problems.

The inventors entered into investigation of the cause of the above problems and found that the above problems result from that water penetrating inside the tension member degrades the adhesive property between primary twist yarns (3/0 fiber strands).

In detail, glass fibers forming the glass fiber strand are adhered to each other with the above-mentioned RFL, and the glass fiber strands forming the primary twist yarn are also closely adhered to each other through the RFL with which they are coated with no substantial gap between them. However, when a plurality of such primary twist yarns are parallel-arranged and final-twisted, microscopic asperities is produced on the surface of each primary twist yarn due to the final twist so that the primary twist yarns cannot be completely adhered to each other. Further, since the primary twist yarns are bonded to each other only through the adhesive property of the RFL, its bonding strength is weak. Therefore, when water penetrates inside the tension member, the water degrades the adhesive property between the primary twist yarns so that the primary twist yarns having obtained the freedom move slide on each other thereby damaging each other.

According to an aspect of the present invention to solve such a problem, a tension member for belt is characterized in that a plurality of glass fibers are parallel-arranged, are dipped in an RFL liquid mixture so that gaps between the glass fibers are filled with the RFL liquid mixture, are returned from the liquid mixture and are subjected to heat treatment whereby the glass fibers are adhered to each other, and that the glass fibers adhered to each other are twisted in a single direction.

In the case of the above-mentioned tension member for belt, there occurs no problem of separation between the primary twist yarns and the water resistance of the glass cord which was poor can be improved, so that flex fatigue resistance can be enhanced in hot and humid conditions.

According to a further aspect of the invention, a tension member for belt is characterized in that a plurality of glass fiber strands are parallel-arranged and primary-twisted into a primary twist yarn, a plurality of the primary twist yarns are parallel-arranged, are dipped in an RFL liquid mixture so that gaps between the primary twist yarns are filled with the adhesion treatment liquid, are returned from the liquid mixture and are subjected to heat treatment whereby the primary twist yarns are adhered to each other, and that the primary twist yarns adhered to each other are final-twisted opposite to the direction of the primary twist.

In this tension member, the primary twist yarns (primary-twisted glass fiber strands) are closely adhered to each other through the RFL liquid mixture with no substantial gap left, so that it is prevented that water enters between the primary twist yarns, thereby enhancing flex fatigue resistance. Further, the tension member can be avoided from increasing in rigidity. Accordingly, when the tension member is used for a power transmission belt, the water resistance of the belt can be improved, so that flex fatigue resistance of the belt can be increased in hot and humid conditions.

According to a still further aspect of the invention, a tension member for belt is characterized in that a plurality of glass fibers are parallel-arranged, are dipped in an RFL liquid mixture containing hydrogenated nitrile rubber latex so that gaps between the glass fibers are filled with the liquid mixture, are returned from the liquid mixture and are subjected to heat treatment whereby the glass fibers are adhered to each other, and that the glass fibers adhered to each other are twisted in a single direction.

This tension member has large heat resistance since the latex is hydrogenated nitrile rubber latex. Further, since hydrogenated nitrile rubber has poor water absorbency, bonded glass fibers can be prevented from coming loose due to water so that the water resistance of the belt can be improved. This provides an advantage of enhancing the flex fatigue resistance of the belt in hot and humid conditions.

According to a still further aspect of the invention, a tension member for belt is characterized in that a plurality of glass fiber strands are parallel-arranged and primary-twisted into a primary twist yarn, a plurality of the primary twist yarns are parallel-arranged, are dipped in an RFL liquid mixture containing hydrogenated nitrile rubber latex so that gaps between the primary twist yarns are filled with the liquid mixture, are returned from the liquid mixture and are subjected to heat: treatment whereby the primary twist yarns are adhered to each other, and that the primary twist yarns adhered to each other are final-twisted opposite to the direction of the primary twist.

Also in this tension member, heat resistance and water resistance can be improved through the use of hydrogenated nitrile rubber latex. This provides an advantage of increasing flex fatigue resistance in hot and humid conditions.

According to a still further aspect of the invention, a tension member for belt is characterized in that a plurality of glass fibers are parallel-arranged, are dipped in a rubber cement so that gaps between the glass fibers are filled with the rubber cement, are returned from the rubber cement and are subjected to heat treatment whereby the glass fibers are adhered to each other, and that the glass fibers adhered to each other are twisted in a single direction.

This tension member has an advantage in water resistance over the aforementioned case of using the RFL liquid mixture, through the use of the rubber cement, so that the water resistance of the running belt can be improved.

According to a still further aspect of the invention, a tension member for belt is characterized in that a plurality of glass fiber strands are parallel-arranged and primary-twisted into a primary twist yarn, a plurality of the primary twist yarns are parallel-arranged, are dipped in a rubber cement so that gaps between the primary twist yarns are filled with the rubber cement, are returned from the rubber cement and are subjected to heat treatment whereby the primary twist yarns are adhered to each other, and that the primary twist yarns adhered to each other are final-twisted opposite to the direction of the primary twist.

Also in this tension member, as in the case of using the RFL liquid mixture, the primary twist yarns are closely adhered to each other through the rubber cement with no substantial gap left so that water resistance can be improved. Further, since increase in rigidity can be restricted, this provides an advantage of increasing the flex fatigue resistance of the belt. In addition, since heat resistance and water resistance can be improved, this provides an advantage of increasing flex fatigue resistance in hot and humid conditions.

According to a still further aspect of the invention, the surface of the tension member for belt is coated with a film containing rubber as a main ingredient. Therefore, the adhesive strength between the tension member and the rubber belt body is increased so that the running stability and the water resistance of the belt can be improved. This dramatically enhances the flex fatigue resistance of the belt in hot and humid conditions.

A belt of the present invention includes the above-mentioned tension member for belt. Accordingly, large water resistance and flex fatigue resistance can be obtained.

According to a further aspect of the invention, a synchronous belt comprises: a tension member extending through-out the length of the belt; a backing rubber bonded on the outer peripheral side of the tension member; and a plurality of tooth rubbers which are bonded on the inner peripheral side of the tension member and are arranged at intervals in a length direction of the belt, wherein any one of various types of the tension members above-mentioned is used as a tension member. Thereby, the water resistance of the synchronous belt is improved so that the flex fatigue resistance of the belt in hot and humid conditions can be increased.

According to a still further aspect of the invention, a method of producing a tension member for belt comprises: a step of parallel-arranging a plurality of glass fibers, dipping the glass fibers in an RFL liquid, returning the dipped glass fibers from the liquid and subjecting the returned glass fibers to heat treatment; a step of twisting a strand of the heat-treated glass fibers in a single direction.

According to a still further aspect of the invention, a method of producing a tension member for belt comprises: a first step of collecting a plurality of glass fiber strands and primary-twisting the glass fiber strands thereby forming a primary twist yarn; a second step of parallel-arranging a plurality of the primary twist yarns subjected to the first step, dipping the primary twist yarns in an RFL liquid, returning the dipped primary twist yarns from the liquid and subjecting the returned primary twist yarns to heat treatment; and a third step of final-twisting the plurality of primary twist yarns subjected to the second step in a direction opposite to the primary twist.

According to a still further aspect of the invention, a method of producing a tension member for belt comprises: a first step of parallel-arranging a plurality of glass fiber strands in the form of a band so that the glass fiber strands are arranged with no substantial clearance and form a squashed ellipse in section; a second step of dipping the plurality of glass fiber strands parallel-arranged like a band in an RFL liquid, returning the dipped glass fiber strands from the liquid and subjecting the returned glass fiber strands to heat treatment thereby forming a band-like substance; and a third step of twisting the band-like substance in a single direction.

In this method, the RFL liquid is easy to penetrate the entire band-like substance and heat treatment can have a uniform effect on the entire band-like substance.

In detail, when the plurality of glass fiber strands are parallel-arranged in such a manner as to form a circle in section thereby forming a bundle, the bundle whose section is circular is readily impregnated to the vicinity of the surface with the RFL liquid. However, since there is a long distance from the surface to the core, it is difficult that the entire bundle is evenly impregnated with the RFL liquid. On the other hand, in this method, since the plurality of glass fiber strands are parallel-arranged in such a manner as to form a squashed ellipse in section thereby forming a flat bundle, this decreases a penetration distance required to completely impregnate from the surface to the core of the flat bundle with the RFL liquid, thereby resulting in even impregnation throughout the entire bundle. Further, when a plurality of glass fiber strands are parallel-arranged in such a manner as to form a circle in section, it takes long time to have an effect of heat treatment after impregnation on the core of the bundle, so that the bundle is apt to be unevenly heated between the surface and the core. On the other hand, when a plurality of glass fiber strands are parallel-arranged in such a manner as to form a squashed ellipse in section, heat treatment has a quick effect on the core of the bundle so that the RFL from the surface to the core can be evenly heated to react.

According to a still further aspect of the invention, a method of producing a tension member for belt comprises: a first step of collecting a plurality of glass fiber strands and primary-twisting the collected glass fiber strands thereby forming a primary twist yarn; a second step of parallel-arranging a plurality of the primary twist yarns subjected to the first step in the form of a band in such a way as to leave no substantial clearance and form a squashed ellipse in section, dipping the primary twist yarns in an RFL liquid, returning the dipped primary twist yarns from the liquid and subjecting the returned primary twist yarns to heat treatment thereby forming a band-like substance; and a third step of final-twisting the band-like substance subjected to the second step in a direction opposite to the primary twist.

According to a still further aspect of the invention, the method of producing a tension member for belt further comprises a step of dipping the tension member for belt produced in any one of the above manners in a rubber cement, returning the tension member from the rubber cement and subjecting the returned tension member to heat treatment.

The glass fibers to be used in each of the above aspects of the invention are not particularly limited. Common non-alkaline glass fibers may be used. For example, when high strength glass fibers which each have a diameter of 8 $\mu$m or below and a tensile strength of 300 kgf/mm$^2$ or more, preferably 350 kgf/mm$^2$ or more, is used, the diameter of the cord (tension member) can be minimized with its strength maintained while increasing flex fatigue resistance.

In the case that a tension member of the present invention is used for a belt of an OHC engine of an automobile, consideration must be made about the balance between cord strength and cord diameter. It is preferable that the number of fibers of the tension member is between 4000 and 6600. When the number of fibers is below 4000, desired strength cannot be obtained. On the other hand, when the number of fibers is above 6600, the cord diameter is too large thereby inconveniently working on flex fatigue resistance.

For an RFL liquid to be used in the invention, its latex is not particularly limited. For example, in addition to hydrogenated nitrile rubber latex such mentioned above, there may be used latex such as styrene-butadiene-vinylpyridine terpolymer, chlorosulfonated polyethylene, acrylonitrile rubber, epichlorohydrine, SBR, chloroprene rubber, chlorinated butadiene rubber, olefine-vinylester copolymer, and natural rubber or a mixture of such kinds of latex. Further, an additive such as a softener may be added to the RFL liquid as required.

The rubber cement is a diene rubber compound such as hydrogenated nitrile rubber and chlorosulfonated polyethylene rubber or a high-saturated hydrogenated nitrile rubber compound which are each dissolved in an organic solvent. Alternatively, hydrogenated nitrile rubber may contain organic peroxide.

The solvent for rubber cement is not particularly limited. In general, aromatic hydrocarbon such as benzene, toluene and xylene or halogenated aliphatic hydrocarbon such as ether and trichloroethylene is suitably used for the solvent.

Rubber material forming a rubber film on the surface of the tension member for belt is not particularly limited. However, considering the adhesive property of the tension member to a rubber belt body, a halogen-contained compound such as chlorinated rubber, polyvinyl chloride, chloroprene rubber and chlorosulfonated polyethylene rubber may be preferably used for the rubber material.

DESCRIPTION OF PREFERRED EMBODIMENTS

<Embodiment 1>

Figure 1:
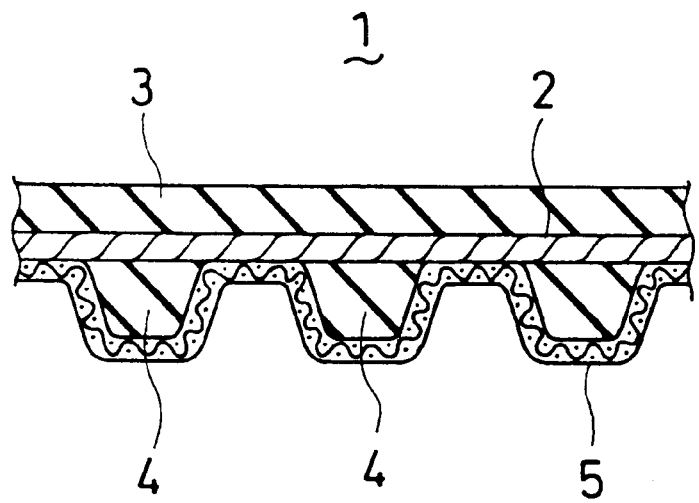
FIG. 1 is a longitudinally cross-sectional view of a synchronous belt.

As shown in FIG. 1, a belt 1 of the present invention is a synchronous belt (power transmission belt), which comprises a tension member 2 provided in a circumferential direction of the belt, a backing rubber 3 provided on one side (belt back face side) of the tension member 2, and tooth rubbers 4 arranged at specific intervals in the circumferential direction of the belt on the opposite side of the tension member 2. The tooth rubbers 4 are covered with a tooth fabric 5.

Figure 2:
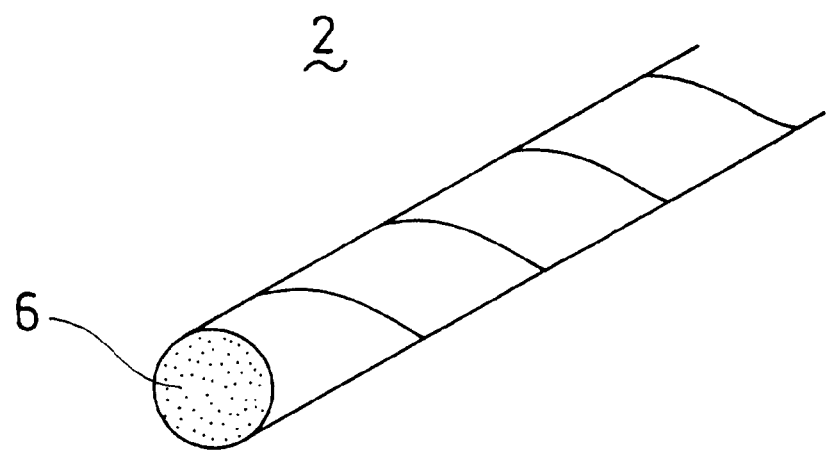
FIG. 2 is a partly cross-sectional, perspective view showing a tension member for belt of Embodiment 1 of the present invention.

FIG. 2 shows the above-mentioned tension member 2. The tension member 2 is formed of a glass cord. The glass cord is produced in a way that 33 fiber strands in each of which 200 non-alkaline glass fibers 6, each formed of E-glass having a diameter of 9 $\mu$m and a tensile strength of 275 kgf/mm$^2$, are collected into a fiber strand, 33 fiber strands thus obtained are parallel-arranged, the fiber strands are dipped in a Vp-SBR-contained RFL liquid of 20 wt % concentration, the dipped fiber strands are returned from the RFL liquid, the returned fiber strands are subjected to heat treatment at 240° C. for one minute, and that the heat-treated fiber strands are twisted at a rate of 2 times per inch. The Vp-SBR-contained RFL uses as its latex Vp-SBR (vinylpyridine-styrene-butadiene terpolymer). The glass fiber made of E-glass contains 53–55% $SiO_2$, 14–16% $Al_2O_3$, 17–22% CaO, 1–4% MgO, 0.3–0.7% $Na_2O+K_2O$, 6–8% $B_2O_3$, under-0.2% $Fe_2O_3$ and 0.1–0.3% $F_2$.

The backing rubber 3 and tooth rubbers 4 are each made of rubber composition using hydrogenated nitrile rubber as its main ingredient. The tooth fabric 5 uses 6,6-nylon yarns as yarns extending in a belt width direction and woollie yarns made of 6,6-nylon yarns as yarns extending in a belt length direction.

The synchronous belt 1 was formed, using the above-mentioned materials, by normal molding. The tooth form was an STS tooth type. The tooth pitch was 8 mm, the number of teeth was 113 and the belt width was 19 mm.

<Embodiment 2>

Figure 3:
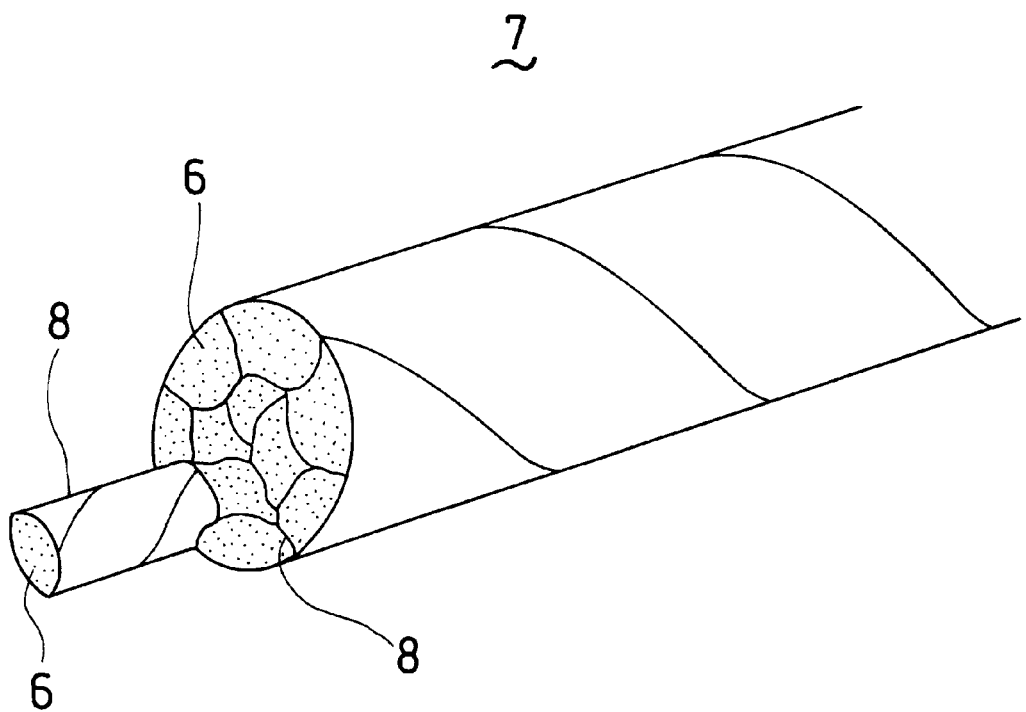
FIG. 3 is a partly cross-sectional, perspective view showing a tension member for belt of Embodiment 2 of the present invention.

As shown in FIG. 3, a tension member 7 of this embodiment is so formed that 11 primary twist yarns 8 subjected to RFL treatment are parallel-arranged and are final-twisted opposite to the direction of the primary twist.

In detail, each of the primary twist yarns 8 was formed so that 200 non-alkaline glass fibers 6 as in Embodiment 1 were collected into a fiber strand and 3 fiber strands thus obtained were parallel-arranged and were primary-twisted at a rate of 2 times per inch. At the time of final twist, 11 primary twist yarns 8 were parallel-arranged, were dipped in an RFL liquid as in Embodiment 1, were returned from the liquid and were final-twisted at a rate of 2 times per inch opposite to the direction of the primary twist, thereby obtaining a glass cord. Then, a synchronous belt was produced using the resultant glass cord as a tension member in the same manner as in Embodiment 1.

<Embodiment 3>

Figure 4:
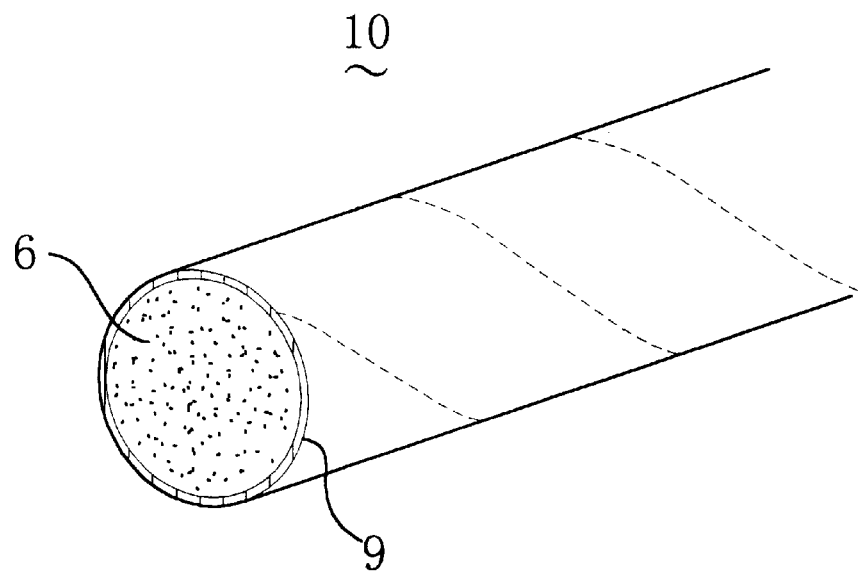
FIG. 4 is a partly cross-sectional, perspective view showing a tension member for belt of Embodiment 3 of the present invention.

A glass cord as in Embodiment 1 was further dipped in a rubber cement solvent of 20 wt % containing as a main ingredient chlorosulfonated polyethylene rubber, was returned from the solvent and was dried for one minute in an atmosphere of 150° C. As a result, a rubber cement layer 9 is formed on the surface of the glass cord as shown in FIG. 4. Then, a synchronous belt was produced using the resultant glass cord as a tension member 10 in the same manner as in Embodiment 1.

<Embodiment 4>

A glass cord as in Embodiment 2 was further subjected to the same rubber cement treatment as in Embodiment 3 thereby forming a rubber cement layer on the surface of the glass cord. A synchronous belt was produced using the glass cord thus obtained as a tension member in the same manner as in Embodiment 1.

<Embodiment 5>

Except that high-strength glass fibers having a fiber diameter of 7 μm and a tensile strength of 437 kgf/mm² were used instead of non-alkaline glass fibers made of E-glass having a fiber diameter of 9 μm, a glass cord was produced in the same manner and conditions as in Embodiment 4. A synchronous belt was produced using the obtained glass cord as a tension member in the same manner as in Embodiment 1. The high-strength glass fiber contained 65% $SiO_2$, 25% $Al_2O_3$, 9–10% MgO and under-1% other metallic oxides such as $Na_2O$, $K_2O$, $Fe_2O_3$ and $Zr_2O_3$. The number of glass fibers was 200×3×11=6600.

<Embodiment 6>

Except that the number of glass fibers was 7000, a glass cord was produced in the same manner and conditions as in Embodiment 5. A synchronous belt was produced using the obtained glass cord as a tension member in the same manner as in Embodiment 1.

<Embodiment 7>

Except that the number of glass fibers was 5200, a glass cord was produced in the same manner and conditions as in Embodiment 5. A synchronous belt was produced using the obtained glass cord as a tension member in the same manner as in Embodiment 1.

<Embodiment 8>

Except that the number of glass fibers was 4000, a glass cord was produced in the same manner and conditions as in Embodiment 5. A synchronous belt was produced using the obtained glass cord as a tension member in the same manner as in Embodiment 1.

<Embodiment 9>

Except that the number of glass fibers was 3600, a glass cord was produced in the same manner and conditions as in Embodiment 5. A synchronous belt was produced using the obtained glass cord as a tension member in the same manner as in Embodiment 1.

<Embodiment 10>

Except that rubber cement treatment was made instead of the RFL treatment and heat treatment was made at 150° C. for one minute, a glass cord was produced in the same manner and conditions as in Embodiment 1. A synchronous belt was produced using the resultant glass cord as a tension member in the same manner as in Embodiment 1. The rubber cement was an MEK (methyl ethyl ketone) solvent of a 15% solids content which contains hydrogenated nitrile rubber as a main ingredient. The composition of the rubber cement is as follows:

H-NBR (Zetpol 2020 produced by Nippon Zeon Co., Ltd.)

| | |
|---|---|
| H-NBR (Zetpol 2020 produced by Nippon Zeon Co., Ltd.) | 100 phr |
| Carbon black | 50 phr |
| Antioxidant | 2.5 phr |
| Processing adjutant | 3.0 phr |
| ZnO | 5.0 phr |
| Stearic acid | 0.5 phr |
| DCP (Dicumyl peroxide) | 4.0 phr |
| Co-cross-linker | 3.0 phr |

The above compound was diluted to 15% by methyl ethyl ketone.

<Embodiment 11>

Except that rubber cement treatment was made instead of the RFL treatment and heat treatment was made at 150° C. for one minute, a glass cord was produced in the same manner and conditions as in Embodiment 2. A synchronous belt was produced using the resultant glass cord as a tension member in the same manner as in Embodiment 1. The rubber cement used in this embodiment was the same as in Embodiment 10.

<Embodiment 12>

The tension member of Embodiment 10 was further subjected to rubber cement treatment with a rubber cement as in Embodiment 3 thereby forming a glass cord whose surface was coated with a rubber cement layer. A synchronous belt was produced using the obtained glass cord as a tension member in the same manner as in Embodiment 1.

<Embodiment 13>

The tension member of Embodiment 11 was further subjected to rubber cement treatment with a rubber cement as in Embodiment 3 thereby forming a glass cord whose surface was coated with a rubber cement layer. A synchronous belt was produced using the obtained glass cord as a tension member in the same manner as in Embodiment 1.

COMPARATIVE EXAMPLE 1

200 non-alkaline glass fibers made of E-glass of a fiber diameter of 9 μm were collected into a fiber strand. Three fiber strands thus obtained were parallel-arranged, were dipped in an RFL liquid as in Embodiment 1, were subjected to heat treatment at 240° C. for one minute and were primary-twisted at a rate of 2 times per inch thereby forming a primary twist yarn. 11 primary twist yarns thus obtained were final-twisted at a rate of 2 times per inch opposite to the direction of the primary twist, thereby forming a glass cord. A synchronous belt was produced using the obtained glass cord as a tension member in the same manner as in Embodiment 1.

COMPARATIVE EXAMPLE 2

A glass cord as in Comparative Example 1 was further subjected to rubber cement treatment in the same manner as in Embodiment 3 thereby forming a rubber cement layer on the surface of the glass cord. Then, a synchronous belt 1 was produced using the resultant glass cord as a tension member in the same manner as in Embodiment 1.

COMPARATIVE EXAMPLE 3

Except that rubber cement treatment was made instead of the RFL treatment and heat treatment was made at 150° C. for one minute, a glass cord was produced in the same manner and conditions as in Comparative Example 1. A synchronous belt was produced using the resultant glass cord as a tension member in the same manner as in Embodiment 1. The rubber cement was the same as in Embodiment 10.

COMPARATIVE EXAMPLE 4

A glass cord as in Comparative Example 3 was further subjected to rubber cement treatment in the same manner as in Embodiment 3 thereby forming a rubber cement layer on the surface of the glass cord. Then, a synchronous belt 1 was produced using the resultant glass cord as a tension member in the same manner as in Embodiment 1.

(Water pour bending fatigue test)

Figure 5:
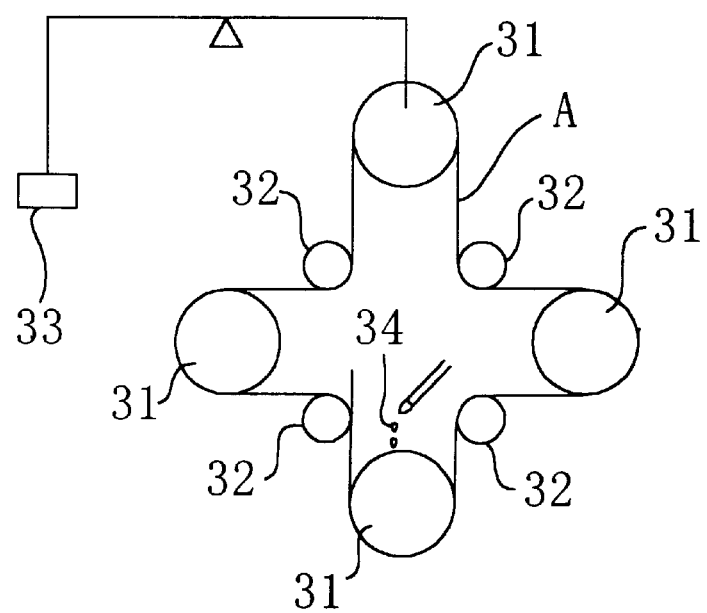
FIG. 5 is a view schematically showing the structure of a belt bending fatigue test machine.

The synchronous belts of the above-mentioned embodiments and comparative examples were subjected to a water pour bending fatigue test. In detail, each of the synchronous belts A was wound around four large pulleys 31 and four small pulleys 32 which each have a 30 mm diameter and are each disposed between the adjacent large pulleys 31. The large pulleys 31 and the small pulleys 32 form the belt bending test machine shown in FIG. 5. A load of 40 kgf was applied to the synchronous belt A by using a weight 33. Under these conditions, the synchronous belt A was driven at 5500 rpm with water 34 pouring at a rate of 1 litter per hour so as to wet the bottom land of the belt. The number of bending times until the belt was broken was measured. The test results are shown in the following Table 1A and 1B.

TABLE 1A

| | | | Treatment | | Glass fiber | | | |
| --- | --- | --- | --- | --- | --- | --- | --- | --- |
| | | Primary twist | Liquid type | Treatment time | Rubber film on Cord | Type | Diam. ($\mu$m) | Number of fibers |
| Embodiment | 1 | NO | RFL | — | NO | E | 9 | 6600 |
| | 2 | YES | RFL | After Primary-twisted | NO | E | 9 | 6600 |
| | 3 | NO | RFL | — | YES | E | 9 | 6600 |
| | 4 | YES | RFL | After Primary-twisted | YES | E | 9 | 6600 |
| | 5 | YES | RFL | After Primary-twisted | YES | High str. | 7 | 6600 |

TABLE 1A-continued

| | | | Treatment | | Glass fiber | | | |
| --- | --- | --- | --- | --- | --- | --- | --- | --- |
| | | Primary twist | Liquid type | Treatment time | Rubber film on Cord | Type | Diam. ($\mu$m) | Number of fibers |
| | 6 | YES | RFL | After Primary-twisted | YES | High str. | 7 | 7000 |
| | 7 | YES | RFL | After Primary-twisted | YES | High str. | 7 | 5200 |
| | 8 | YES | RFL | After Primary-twisted | YES | High str. | 7 | 4000 |
| | 9 | YES | RFL | After Primary-twisted | YES | High str. | 7 | 3600 |
| | 10 | NO | Rubber Cement | — | NO | E | 9 | 6600 |
| | 11 | YES | Rubber Cement | After Primary-twisted | NO | E | 9 | 6600 |
| | 12 | NO | Rubber Cement | — | YES | E | 9 | 6600 |
| | 13 | YES | Rubber Cement | After Primary-twisted | YES | E | 9 | 6600 |
| Comparative | 1 | YES | RFL | Before primary-twisted | NO | E | 9 | 6600 |
| | 2 | YES | RFL | Before primary-twisted | YES | E | 9 | 6600 |
| | 3 | YES | Rubber Cement | Before primary-twisted | NO | E | 9 | 6600 |
| | 4 | YES | Rubber Cement | Before primary-twisted | YES | E | 9 | 6600 |

TABLE 1B

| | | Bending times until belt break ($\times 10^8$) | Belt strength (kgf) |
| --- | --- | --- | --- |
| Embodiment | 1 | 0.976 | 1240 |
| | 2 | 1.08 | 1200 |
| | 3 | 1.02 | 1250 |
| | 4 | 1.18 | 1210 |
| | 5 | 1.80 | 1350 |
| | 6 | 1.10 | 1550 |
| | 7 | 1.97 | 1070 |
| | 8 | 2.65 | 970 |
| | 9 | 2.87 | 700 |
| | 10 | 1.32 | 1220 |
| | 11 | 1.54 | 1240 |
| | 12 | 1.48 | 1240 |
| | 13 | 1.72 | 1250 |
| Comparative Example | 1 | 0.0365 | 1200 |
| | 2 | 0.0662 | 1210 |
| | 3 | 0.0655 | 1190 |
| | 4 | 0.0852 | 1250 | wherein the belt strength shows values of the synchronous belts each have a 19 mm width and indicates respective initial values.

As shown in the above Table 1A and 1B, the synchronous belts of Embodiments 1–13 are greater in bending times until belt break than Comparative Examples 1–4. As is evident from this, the present invention has the effect of dramatically enhancing the water resistance and the bending property of the belt.

Embodiment 1 and Embodiment 2 are different only in primary twist from each other. Similar are respective relationships between Embodiments 3 and 4, between Embodiments 10 and 11 and between Embodiments 12 and 13. When comparison is made to every two Embodiments above-mentioned each having the above relationship, primary-twisted ones are greater in bending times until belt break and are larger in belt strength. As seen from this, the bending property of the belt can be further enhanced by first primary-twisting glass fibers and then subjecting them to RFL treatment or rubber cement treatment.

Embodiments 1 and 10 are different from each other only in that the treatment liquid is an RFL liquid or a rubber cement. Similar are respective relationships between Embodiments 2 and 11, between Embodiments 3 and 12 and between Embodiments 4 and 13. When comparison is made to every two Embodiments above-mentioned each having the above relationship, the embodiments subjected to rubber cement treatment are greater in bending times until belt break. It can be supposed that the reason for this is that the rubber cement is smaller in water absorption of a tension member than the RFL.

Embodiments 1 and 3 are different from each other only in that the cord surface is coated with the rubber cement layer or not. Similar are respective relationships between Embodiments 2 and 4, between Embodiments 10 and 12 and between Embodiments 11 and 13. When comparison is made to every two embodiments above-mentioned each having the above relationship, the embodiments covered with the rubber cement layer are greater in bending times until belt break. It can be supposed that the reason for this is that the rubber cement layer stabilizes the adhesive strength between the tension member and the rubber belt body (backing rubber and tooth rubbers) thereby increasing the water resistance of the running belt.

When comparison is made between Embodiments 4 and 5, the latter is different from the former only in that high strength glass fibers of a fiber diameter of 7 μm are used as material for glass cord and the latter is greater in bending times until belt break than the former. It can be supposed that the reason for this is that Embodiment 5 is lower in rigidity. Embodiments 5–9 are each made of high strength glass fibers and are different in number of fibers from each other. When comparison is made to the embodiments, bending times until belt break are greater as the number of fibers becomes small. It can be supposed that the reason for this is that embodiments smaller in number of fibers are smaller in rigidity and have an advantage of enhancing bending property.

For other types of suitable high-strength glass fibers, there may be used a glass fiber which has a tensile strength of 400 kgf/mm$^2$ and contains 65% $SiO_2$, 24.2% $Al_2O_3$, under-0.1% CaO and 10.1% MgO, and a glass fiber which has a tensile strength of 430 kgf/mm$^2$ and contains 52–56% $SiO_2$, 28–32% $Al_2O_3$, 9–12% CaO, under-0.1% $Na_2O+K_2O$ and under-7% other metallic oxides such as $Y_2O_3$.

Other Embodiments subjected to other RFL treatments
<Embodiment 14>

Figure 6:
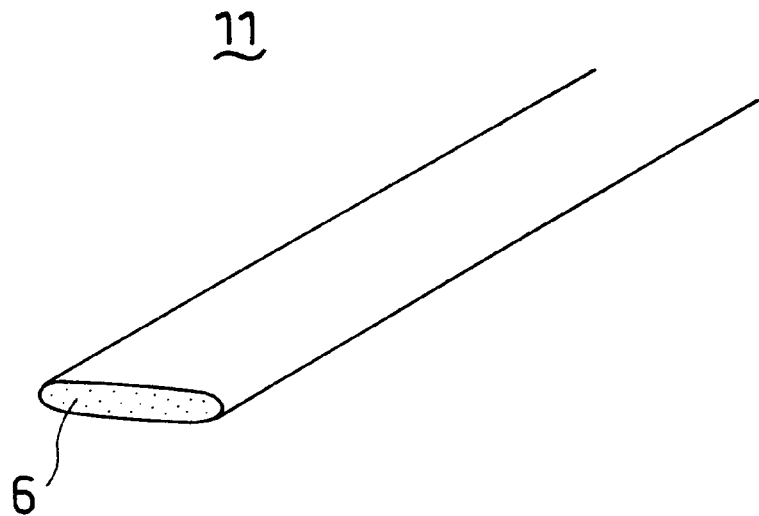
FIG. 6 is a partly cross-sectional, perspective view showing the state that a plurality of glass fiber strands of Embodiment 14 of the present invention are parallel-arranged.
Figure 7:
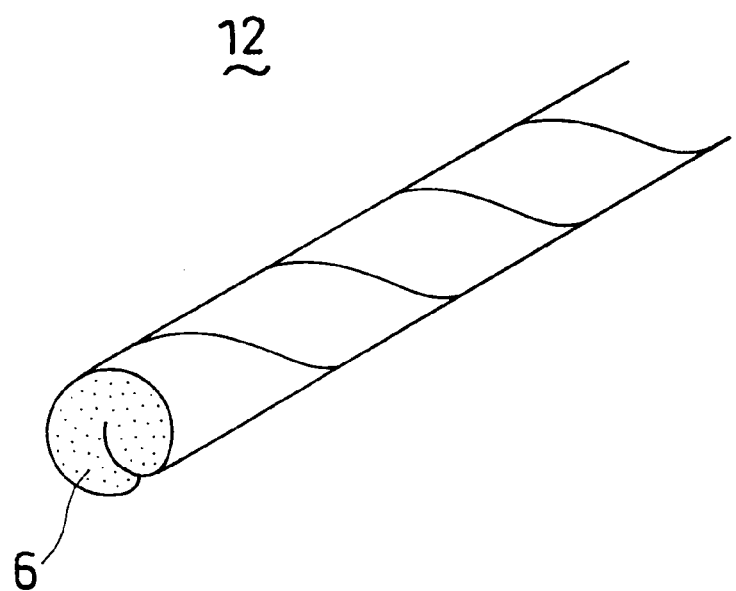
FIG. 7 is a partly cross-sectional, perspective view showing a tension member for belt of Embodiment 14 of the present invention.

200 non-alkaline glass fibers 6 as in Embodiment 1 were collected into a glass fiber strand. 33 glass fiber strands thus obtained were parallel-arranged in the form of a band so as to form a squashed ellipse in section and produce no substantial clearance between fiber strands as shown in FIG. 6. The resultant band-like substance 11 was dipped in a Vp-SBR-contained RFL liquid of 20 wt % concentration, was returned from the liquid and was subjected to heat treatment at 240° C. for one minute. Thereafter, the band-like substance 11 was twisted at a rate of 2 times per inch thereby obtaining a glass cord 12 as a tension member shown in FIG. 7. A synchronous belt was produced using the obtained glass cord 12 in the same manner as in Embodiment 1.

<Embodiment 15>

Figure 8:
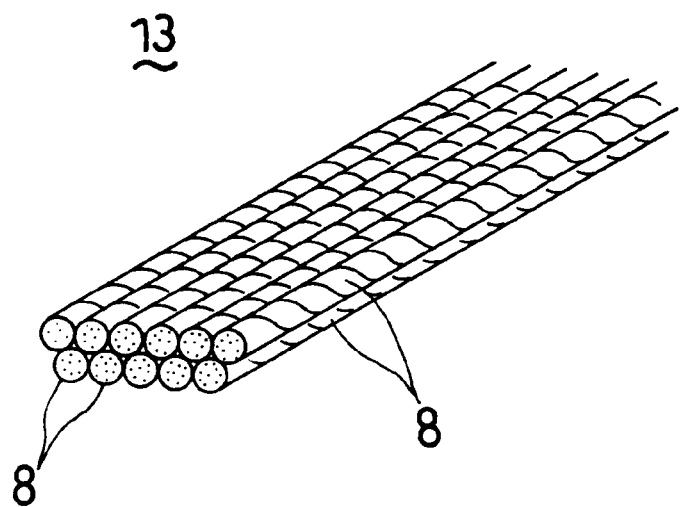
FIG. 8 is a partly cross-sectional, perspective view showing the state that a plurality of primary twist yarns of Embodiment 15 of the present invention are parallel-arranged.
Figure 9:
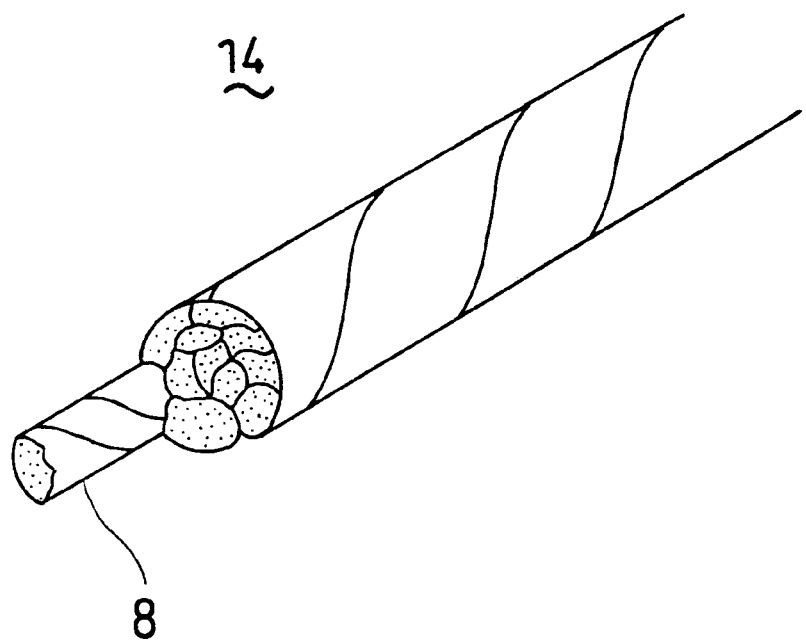
FIG. 9 is a partly cross-sectional, perspective view showing a tension member for belt of Embodiment 15 of the present invention.

200 non-alkaline glass fibers 6 as in Embodiment 1 were collected into a glass fiber strand. 3 glass fiber strands thus obtained were parallel-arranged and primary-twisted at a rate of 2 times per inch thereby forming a primary twist yarn 8 similar to Embodiment 2. Then, as shown in FIG. 8, 11 primary twist yarns 8 thus formed were parallel-arranged in the shape of a band so as to form a squashed ellipse in section and produce no substantial clearance between the primary twist yarns. The resultant band-like substance 13 was dipped in a Vp-SBR-contained RFL liquid as in Embodiment 2, was returned from the liquid and was subjected to heat treatment at 240° C. for one minute. Thereafter, the band-like substance 13 was twisted at a rate of 2 times per inch opposite to the direction of the primary twist thereby obtaining a glass cord 14 as a tension member shown in FIG. 9. A synchronous belt 1 was produced using the obtained glass cord 14 in the same manner as in Embodiment 1.

<Embodiment 16>

A glass cord as in Embodiment 14 was further subjected to the same rubber cement treatment as in Embodiment 3 thereby forming a rubber film on the surface of the glass cord. A synchronous belt 1 was produced using the glass cord thus obtained as a tension member in the same manner as in Embodiment 1.

<Embodiment 17>

A glass cord as in Embodiment 15 was further subjected to the same rubber cement treatment as in Embodiment 3 thereby forming a rubber film on the surface of the glass cord. A synchronous belt 1 was produced using the glass cord thus obtained as a tension member in the same manner as in Embodiment 1.

(Water pour bending fatigue test)

Each of the belts of Embodiments 14–17 was subjected to a bending fatigue test while water was poured on the belt. The test results are shown in the following Table 2.

TABLE 2

| | | RFL treatment | | | |
|---|---|---|---|---|---|
| | Primary twist | Treatment time | Sectional form of substance to be treated | Rubber film on cord | bending times until belt break (×10$^8$) |
| Embodiment | 14 NO | — | Squashed ellipse | NO | 1.20 |
| | 15 YES | After primary-twisted | Squashed ellipse | NO | 1.48 |
| | 16 NO | — | Squashed ellipse | YES | 1.53 |
| | 17 YES | After primary-twisted | Squashed ellipse | YES | 1.80 |

Respective relationships between Embodiments 1 and 14, between Embodiments 2 and 15, between Embodiments 3 and 16 and between Embodiments 4 and 17 are different only in that parallel-arranged glass fibers or primary twist yarns before RFL treatment form a circle or a squashed ellipse (band) in section. When comparison is made between every two embodiments above-mentioned each having the above relationship, the embodiments forming a squashed ellipse in section are greater in bending times until belt break. It can be understood that the reason for this is that parallel arrangement of the glass fibers or the primary twist yarns into the form of a band allows the fibers to be excellently impregnated with the RFL liquid and the entire fibers to be evenly heated.

Embodiments using RFL containing H-NBR latex
<Embodiment 18>

200 non-alkaline glass fibers 6 made of E-glass of a fiber diameter of 9 μm were collected into a glass fiber strand. 33 glass fiber strands thus obtained were parallel-arranged, were dipped in an RFL liquid containing H-NBR latex and having the below-mentioned composition, were returned from the liquid and were subjected to heat treatment at 250° C. for one minute. Thereafter, the glass fiber strands were twisted at a rate of 2 times per inch thereby obtaining a glass cord. A synchronous belt was produced using the obtained glass cord as a tension member in the same manner as in Embodiment 1.

Composition of H-NBR-contained RFL liquid (weight ratio)

| Resorcine | 7.2 |
| 37% Formaldehyde | 7.6 |
| 10% NaOH water solution | 7.0 |
| H-NBR latex ("Zetpol 2020" produced by Nippon Zeon Co. Ltd.) | 401.7 |
| Deionized water | 465 |

<Embodiment 19>

200 non-alkaline glass fibers 6 as in Embodiment 1 were collected into a glass fiber strand. 3 glass fiber strands thus obtained were parallel-arranged and primary-twisted at a rate of 2 times per inch thereby forming a primary twist yarn. Then, 11 primary twist yarns 8 thus formed were parallel-arranged, were dipped in an RFL liquid as in Embodiment 18, were returned from the liquid and were subjected to heat treatment at 250° C. for one minute. Thereafter, the primary twist yarns were twisted at a rate of 2 times per inch opposite to the direction of the primary twist thereby obtaining a glass cord. A synchronous belt was produced using the obtained glass cord as a tension member in the same manner as in Embodiment 1.

<Embodiment 20>

A glass cord as in Embodiment 18 was further dipped in a 20 wt % rubber cement solution containing chlorosulfonated polyethylene as a main ingredient, was returned from the solution and was dried in an atmosphere of 150° C. for one minute thereby forming a rubber film on the surface of the glass cord. Then, a synchronous belt was produced using the glass cord as a tension member in the same manner as in Embodiment 1.

<Embodiment 21>

A glass cord as in Embodiment 19 was further subjected to the same rubber cement treatment as in Embodiment 20 thereby forming a rubber film on the surface of the glass cord. A synchronous belt was produced using the glass cord thus obtained as a tension member in the same manner as in Embodiment 1.

<Comparative Example 5>

200 non-alkaline glass fibers made of E-glass having a fiber diameter of 9 μm were collected into a glass fiber strand. 3 glass fiber strands thus obtained were parallel-arranged, were dipped in an RFL liquid as in Embodiment 18 and were subjected to heat treatment at 250° C. for one minute. Thereafter, the glass fiber strands were twisted at a rate of 2 times per inch thereby obtaining a primary twist yarn. 11 primary twist yarns thus obtained were final-twisted at a rate of 2 times per inch opposite to the direction of the primary twist thereby forming a glass cord. A synchronous belt was produced using the obtained glass cord as a tension member in the same manner as in Embodiment 1.

COMPARATIVE EXAMPLE 6

A glass cord as in Comparative Example 5 was subjected to the same rubber cement treatment as in Embodiment 20 thereby forming a rubber film on the surface of the glass cord. A synchronous belt 1 was produced using the glass cord thus obtained as a tension member in the same manner as in Embodiment 1.

COMPARATIVE EXAMPLE 7

Except that Vp-SBR-contained RFL was used instead of H-NBR-contained RFL, a glass cord was produced in the same manner and conditions as in Embodiment 20. A synchronous belt was produced using the resultant glass cord as a tension member in the same manner as in Embodiment 1.

(Water pour bending fatigue test)

Each of the belts of Embodiments 18–21 and Comparative Examples 2, 5, 6 and 7 was subjected to a bending fatigue test while water was poured on the belt. The test results are shown in the below-mentioned Table 3.

(Heat-aged belt bending test)

Each of the belts of Embodiments 18–21 and Comparative Examples 2, 5, 6 and 7 was subjected to heat treatment that ages the belt in an oven at 150° C. for 168 hours. The aged belt was wound around a running test machine having the same layout as in FIG. 5 and was run $10^8$ times while bent on the test machine. With respect to each of the belts after run, a belt strength maintaining ratio was measured. In this running test, no water was poured on the belts. The test results are shown in the below-mentioned Table 3.

TABLE 3

| | Primary twist | RFL treatment Latex type | Treatment time | Rubber film on cord | Bending times until belt break ($\times 10^8$) | Belt strength maintaining ratio (%) |
|---|---|---|---|---|---|---|
| Embodiment 18 | NO | H-NBR | — | NO | 1.68 | 84 |
| Embodiment 19 | YES | H-NBR | After primary-twisted | NO | 1.96 | 89 |
| Embodiment 20 | NO | H-NBR | — | YES | 1.88 | 86 |
| Embodiment 21 | YES | H-NBR | After primary-twisted | YES | 2.35 | 90 |
| Comparative 5 | YES | H-NBR | Before primary-twisted | NO | 0.0265 | 88 |
| Comparative 6 | YES | H-NBR | Before primary-twisted | YES | 0.0325 | 87 |
| Comparative 7 | NO | Vp-SBR | — | YES | 1.08 | 42 |
| Comparative 2 | YES | Vp-SBR | Before primary-twisted | YES | 0.0662 | 44 |

As seen from FIG. 3, the belts of Embodiments 18–21 are dramatically improved in water resistance and bending property as compared with the belts of Comparative Examples 5 and 6. Embodiment 20 and Comparative Example 7 have a relationship that they are different only in latex type of an RFL liquid from each other. Embodiment 20 is greater in belt strength maintaining ratio than Comparative Example 7. Accordingly, it can be understood that heat resistance can be improved by using H-NBR as latex of an RFL liquid. Improvement in heat resistance by using H-NBR can be seen from a comparison between Comparative Examples 2 and 6.

What is claimed is:

1. A tension member for a belt which is formed by twisting in a single direction a band-shaped element, wherein said element comprises a plurality of glass fibers which are parallel-arranged into a shape of a flat band with no clearance left therebetween are dipped in an adhesion treatment liquid containing as a main ingredient a mixture of a precondensate of resorcine formaldehyde and rubber or elastomeric latexes; and are returned from the liquid and subjected to heat treatment, the resulting element being in a shape of a flat band.

2. A tension member for a belt which is formed by giving a final twist to a element, wherein said element comprises a plurality of primary-twist yarns which are parallel-arranged into a shape of a flat band with no clearance left therebetween are dipped in an adhesion treatment liquid containing as a main ingredient a mixture of a precondensate of resorcine formaldehyde and rubber or elastomeric latexes; and are returned from the liquid and subjected to heat treatment, the resulting element being in a shape of a flat band;

said primary-twist yarns comprising a plurality of glass fibers which are parallel-arranged and have undergone a primary-twist, wherein twisting directions for said final-twist and said primary-twist are opposite one another.

3. A tension member for a belt according to either of claims 1 and 2, wherein the surface of the tension member is coated with a film containing rubber as a main ingredient.

4. A belt comprising the tension member according to claim 3.

5. A belt comprising the tension member according to either of claims 1 and 2.

* * * * *